Dec. 23, 1969    E. L. MOCHEL    3,485,702
MECHANICAL STRENGTHENING OF GLASS BY ION EXCHANGE
Filed Nov. 23, 1965

INVENTOR.
Ellen L. Mochel
BY Clarence R. Patty, Jr.

United States Patent Office 3,485,702
Patented Dec. 23, 1969

3,485,702
MECHANICAL STRENGTHENING OF GLASS
BY ION EXCHANGE
Ellen L. Mochel, Painted Post, N.Y., assignor to Corning Glass Works, Corning, N.Y., a corporation of New York
Continuation-in-part of application Ser. No. 181,888, Mar. 23, 1962. This application Nov. 23, 1965, Ser. No. 509,287
Int. Cl. C03c 17/06
U.S. Cl. 161—1    11 Claims

ABSTRACT OF THE DISCLOSURE

This invention is concerned with improving the mechanical strength of alkali metal zirconsilicate glass articles by means of an ion exchange reaction wherein, at elevated temperatures below the strain point of the glass, alkali metal ions in the surface of the glass articles are replaced by monovalent metal ions of larger size, whereby an integral surface compressive stress layer is developed on the articles.

---

Figure 1:
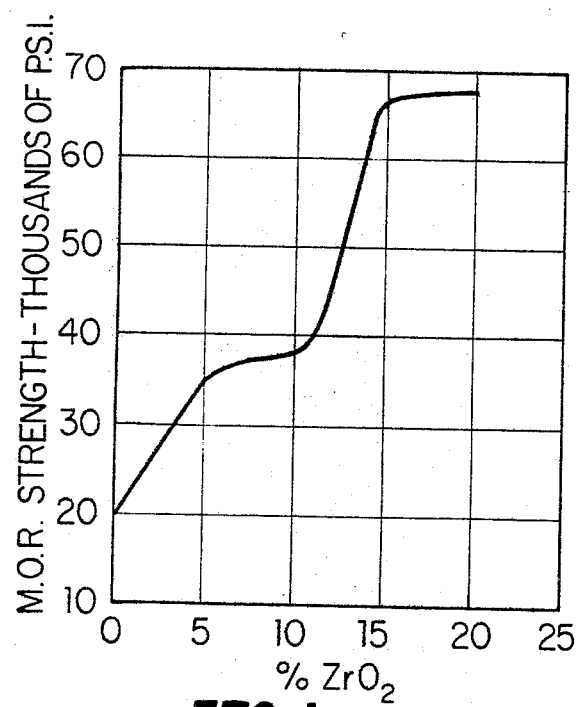

This application is a continuation-in-part of my pending application, Ser. No. 181,888, now abandoned, filed Mar. 23, 1962.

This invention relates to improvements in the art of thermochemically exchanging ions in the surface of a glass article. It is of particular utility as a means of producing a glass article having increased mechanical strength, especially abraded strength, by formation of a compressively stressed surface layer. The improvement is primarily based on the unusual effects achieved by using a particular type of glass in an ion exchange process.

As used in this application, the term "strength" refers to the tensile strength of a material or article determined as modulus of rupture (M.O.R.). This is the transverse strength of a test piece, usually a rod or bar, of known cross section, and is ascertained in a conventional manner. Initially, a breaking load is ascertained by supporting the test piece across two definitely spaced knife edges, mounting a second pair of knife edges on the test piece in uniformly spaced relation between the first two knife edges, and loading the second pair until breakage occurs. The maximum tensile stress, in pounds per square inch, produced at the lower surface of the test piece is then computed from the load, the size and shape of the sample and the test geometry and is reported as M.O.R.

The term "abraded strength" refers to the tensile strength, ascertained as described above, of a body having a multiplicity of abrasions, that is visible scratches or defects, deliberately produced on its surface. The nature and degree of abrasions produced on a glass surface in service will vary with the service conditions. Accordingly, standard abrasion tests have been devised to provide a valid basis for comparison as well as to simulate known types of service conditions.

For present purposes, two types of abrasion have been employed. In one type, a test piece, e.g. a 4 inch by about ¼ inch diameter glass cane, is mechanically mounted and rapidly rotated for about 30 seconds in contact with 150 grit silicon carbide paper under a small constant pressure to maintain uniform contact. A second type is referred to as tumble abrasion. In this case, ten similar size glass rods are mixed with 200 cc. of 30 grit silicon carbide particles, and subjected to a tumbling motion for 15 minutes in a Number 0 ball mill jar rotating at 90 to 100 r.p.m. Surface flaws resulting from the first type of abrasion simulate flaws encountered in service as a result of rubbing against hard materials, for example glass articles rubbing against each other. Flaws produced in the latter type simulate those resulting from a combination of such rubbing abrasion and actual impact.

The strength of glass with an undamaged fresh surface is very high, as shown by measured strengths of several hundred thousand p.s.i. on freshly drawn glass fibers and rods. In actual practice, however, the strength of ordinary commercial glassware varies from 5,000 to 25,000 p.s.i. depending on the type of glass, the method of production, and the nature of subsequent handling.

It is well known that the strength of a glass article can be increased by producing a stress of substantially uniform compression in a surface layer on the glass surface. Among the known methods of producing such a surface compression layer are physical application of a casing, thermal tempering and ion exchange.

The conventional method of "casing" glass comprises covering an initial gather of one type of glass with a gather of a second glass having a lower thermal expansion coefficient than the first and then shaping the composite gather of glass as by blowing. As the composite glass article is cooled, the inner glass having the higher thermal expansion coefficient tends to contract more than the surface glass thereby producing a permanent compressional stress in the outside glass layer. Use of this method has been extremely limited because of the difficulties in producing a uniformly cased glass article.

In thermal tempering, a glass article is heated close to the glass softening temperature. The article is then rapidly chilled below the glass strain point to develop compressional stress in a surface layer. The article is usually heated and chilled in air, although suitable salt baths are also employed on occasion for either step. The effective time for either heating or cooling does not normally exceed a minute or two, and is a mater of several seconds where a salt bath is employed. Thermal tempering is the conventional commercial method of strengthening glass articles with the usual strength of a tempered glass article being about 2½ to 3½ times the strength of a corresponding annealed glass article. It is desirable to provide considerably higher strengths in many glass articles. Also, the thermal tempering process is usually not feasible with thin glass articles, with articles having widely varying thickness, and with articles having internal surfaces which cannot readily be chilled, for example, narrow necked bottles.

The ion exchange method of producing a compression layer involves exposing a glass surface to a source of ions which, at an elevated temperature, exchange with an ion present in the glass. This produces a surface layer of glass having a composition differing from that of the parent glass, and, in essence, is a thermochemical method of casing glass.

U.S. Patent Nos. 2,075,446 and 2,779,136 describe a high temperature ion exchange process wherein alkali ions within a glass are replaced (by copper or silver and lithium ions respectively) by immersion of the glass in a high temperature molten salt bath containing the replacement ions. In accordance with the patent teachings, the ion exchange is effected above the strain point of the glass to produce a relatively low expansion coefficient glass casing and avoid surface cracking or crazing otherwise encountered and detrimental to strengthening. Furthermore, optimum strengthening is comparable to thermal tempering values, except where formation of a crystal phase occurs in the glass surface. Douglas and Isard, in "Transactions of the Society of Glass Technology," vol. 33, pp. 289–335 (1949), describe a process of soda extraction catalyzed by sulfur oxides which may involve ion exchange in the presence of hydrogen ions, the exchange being between sodium ions from the glass and hydrogen ions from the atmosphere. As indicated by Patent No. 2,075,446, ion exchange is also a preliminary step in glass staining, wherein silver or copper ions are exchanged for sodium ions and are precipitated in colloidal form to produce an amber or ruby color.

Kistler, in an article entitled "Stresses in Glass Produced by Nonuniform Exchange of Monovalent Ions" and published in the Journal of the American Ceramic Society, vol. 45, No. 2, pp. 59–68 (1962), proposes a method of strengthening glass by exchanging ions in the glass at a relatively low temperature. In accordance with this proposed strengthening method, a layer of compressive stress is induced by replacing a small diameter alkali metal ion in a surface layer of a glass article by a larger diameter alkali metal ion from an external source. The compressive stress is developed directly from the ion exchange which must be carried out at a temperature sufficiently low to avoid stress relaxation.

Such a low temperature method of ion exchange strengthening is particularly desirable because it minimizes article distortion during the strengthening treatment. It is also desirable because it provides strengthening without crystal development, and thereby provides a completely transparent strengthened product. This is vital in ophthalmic lenses and other applications in the field of optics where light scattering cannot be tolerated. It is desirable in other types of glassware as well, such as table glassware where a basic advantage of glass is its clarity.

Rather high mechanical strengths are reported to be obtainable under optimum circumstances with the potassium ion method of strengthening commercially available lime glasses. Further study reveals that, while high strengths may be obtained, they are largely or completely lost when such a strengthened glass article is subjected to some degree of abrasion in service. Accordingly, high strength is usually of little interest unless it is abraded strength, that is the strength of a glass article after the article has been subjected to either service or experimental test abrasion.

It has now been discovered that $R_2O$—$ZrO_2$—$SiO_2$ glasses, i.e. glasses containing at least 5% zirconia, are affected in a surprising, and as yet unexplained, manner when exposed to a low temperature type of ion exchange treatment. This phenomenal effect of ion exchange on $R_2O$—$ZrO_2$—$SiO_2$ glasses manifests itself in the nature of the ion exchange layer formed, especially the nature of the strengthening that results from forming such compressively stressed layer on a glass article. In accordance with the present discoveries, the abraded strength of a glass article can be increased to values ranging from 20,000 p.s.i. to over 100,000 p.s.i. within 1 to 16 hours depending on the glass, the type of ion exchange process and temperature of treatment. This is in contrast to prior experience with commercial soda lime glasses where only nominal increases in abraded strength were obtained by corresponding treatment.

The low temperature type ion exchange treatment is generally effective in producing increased abraded strengths in $R_2O$—$ZrO_2$—$SiO_2$ glasses whenever large monovalent metal ions replace smaller alkali metal ions in the glass, e.g. potassium ions replace sodium ions. It is apparent that the presence of zirconia in relatively large amounts exerts some unusual influence, the nature of which is especially puzzling. It does not appear to be explainable by the depth of penetration or amount of ion exchange effected despite the fact that ion exchange to a depth of several microns seems to be essential. Thus, a substantial increase in abraded strength of an

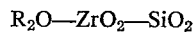

glass may be observed by effecting a given amount of ion exchange to a given depth (as shown by weight increase and chemical analyses), where as an equal or even greater amount of exchange in a soda lime glass does not produce a corresponding increase in abraded strength. It appears that some unexplained effect, over and beyond depth and degree of ion exchange, is involved in this puzzling phenomenon. Further, the effect does not appear to directly involve a major structural change, as in the case where low expansion crystals containing alumina are precipitated.

It has further been found that simple ternary $R_2O$—$Al_2O_3$—$SiO_2$ and $R_2O$—$ZrO_2$—$SiO_2$ glasses having favorable strengthening characteristics may have certain other glass properties that are undesirable. For example, simple $R_2O$—$ZrO_2$—$SiO_2$ glasses tend to have relatively high liquidus values which increase as the $ZrO_2$ content of the glass increases. This undesirable characteristic is not nearly so pronounced in $R_2O$—$Al_2O_3$—$SiO_2$ glasses. However, when the components other than silica in such alumina glasses are so increase as to reduce the $SiO_2$ content below about 65% acid durability may deteriorate rapidly.

It has been found that both of these serious deficiencies are minimized to a large extent in glasses containing a mixture of $ZrO_2$ and $Al_2O_3$, that is in

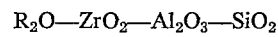

glasses. The $ZrO_2$ component resists acid solubility in a manner similar to silica. Consequently, $ZrO_2$-containing glasses tend to have good acid durability characteristics even though the silica content is low. At the same time, the strengthening potential of a mixed oxide glass is generally the same as that of a ternary glass containing an equivalent amount of either $Al_2O_3$ or $ZrO_2$.

My invention then includes an improved method of producing a glass article composed of an alkali metal silicate glass and having an increased abraded strength obtained by chemically altering a surface layer on the glass article to a depth of at least 5 microns to produce compressive stresses, said chemical altering being carried out by removing a portion of the alkali metal ions from the surface layer on the glass article with replacement by a larger monovalent ion at a temperature such that unrelaxed compressive stresses are developed in the exchange layer by the exchange, the improvement comprising the step of forming the glass article initially from an $R_2O$—$ZrO_2$—$SiO_2$ glass containing at least one alkali metal oxide and more than 5% of $ZrO_2$ whereby larger increases in abraded strength are obtained in a given time of treatment. Preferably, the parent glass also contains alumina ($Al_2O_3$) in an amount such that the total content of $ZrO_2$ plus $Al_2O_3$ is not over about 25%. It will be understood then that, unless otherwise indicated, descriptive and illustrative reference herein to $R_2O$—$ZrO_2$—$SiO_2$ glasses encompasses such mixed $ZrO_2$ and $Al_2O_3$ glasses as well as those containing other optional ingredients. The invention further resides in the strengthened glass article produced by practicing the inventive method.

Available evidence indicates that the unabraded strength of a glass surface can be increased several fold by ion replacement occurring at or very near the glass surface, that is within the initial micron or so of the surface, but that such shallow surface strengthening is largely or completely lost when the surface is abraded. Logically, this might be attributed to the surface abrasion cutting or extending through the strengthened layer, thereby rendering it ineffective. However, since increased abraded strengths may be attained in $R_2O$—$ZrO_2$—$SiO_2$ glasses with depths and total amounts of ion replacement that are ineffective in soda lime glasses, enhanced depth and degree of ion replacement do not appear to completely account for the unusual strengthening potential in $R_2O$—$ZrO_2$—$SiO_2$ glasses.

On the other hand, a substantial depth of ion replacement or thickness of compressive layer produced, is required even in $R_2O$—$ZrO_2$—$SiO_2$ glasses to impart abraded strength. Thus, chemical analyses on successive thin layers chemically stripped from strengthened glasses indicate a depth exceeding 5 microns as generally necessary to provide increased 150 grit abraded strength. Moreover, abraded strength generally increases to a maximum value with increase in time or temperature of treatment. This suggests a complex relationship involving ion exchanged layer thickness, depth of weakening flaws in a glass surface, strength and other unidentified factors as well.

The improved thermochemical ion exchange is effected by bringing a preformed $R_2O$—$ZrO_2$—$SiO_2$ glass article into intimate contact with a material containing thermally exchangeable ions at an elevated temperature. During the ensuing thermally induced ion exchange, ions from the glass are replaced by a corresponding number of ions from the contacting material to maintain an electrical balance in the glass. The depth of this ion exchange or replacement increases both with time and temperature, thus increasing the depth of the glass surface layer formed by this ion exchange or replacement providing the temperature is not so high as to permit stress relaxation.

Prior to the thermochemical ion exchange step of the present method, an $R_2O$—$ZrO_2$—$SiO_2$ glass melt is provided in conventional manner and a glass article is molded therefrom to a desired shape or configuration by a conventional glass forming process such as blowing, pressing, or drawing. The shaped glass article is then brought to a predetermined ion exchange temperature either by interruption of its cooling subsequent to forming, or by reheating.

The low temperature ion exchange process under consideration is a diffusion process wherein the amount of ion exchange increases linearly with the square root of treating time, other factors being equal. Since diffusion rate increases with temperature, it is apparent that the treating temperature should ordinarily be as high as feasible without occurrence of substantial stress relaxation, article deformation or other adverse thermal effects. In general, this means a temperature below the strain point of the glass. On the other hand, a temperature of at least 200° C. is required, and higher temperatures approaching the glass strain point are normally preferred, temperatures in the range 350–500° C. being commonly employed. At such temperatures, optimum strengthening of $Li_2O$—$ZrO_2$—$SiO_2$ glasses is normally attained within a period of about one to four hours, and of

$$Na_2O\text{---}ZrO_2\text{---}SiO_2$$

glasses in 4 to 16 hours. However, adequate strengthening for some purposes can be obtained in lesser times. In any event, the maximum temperature-time cycle or schedule of treatment must not be such that substantial rearrangement of the glass structure and consequent stress relaxation can occur.

By way of illustrating temperature effect, approximately equal degrees of strengthening may be obtained in a glass of sufficiently high strain point under otherwise constant conditions with the following ion exchange schedules: (1) 300° C. for 16 hours, (2) 350° C. for 8 hours, (3) 400° C. for 4 hours, (4) 500° C. for about one hour, and (5) 550° C. for about 15 minutes. The treating schedule will depend primarily on the required depth of ion exchange for the strengthening effect desired, that is the depth of the compression layer produced thereby, and secondarily on considerations of commercial practicality and convenience, an optimum schedule for any given glass or glass article being readily ascertainable by routine experimentation.

The ion exchange schedule will also depend on the ions being exchanged. The rate and depth of exchange are greater in the smaller size pairs. Accordingly, the most rapid exchange can be expected in the case of lithium-sodium exchange. It also follows that for a given ion in the glass, most rapid exchange is obtained with the next larger alkali ion in the Periodic Table, e.g. lithium-sodium, sodium-potassium, potassium-rubidium and rubidium-cesium. Monovalent ions other than the alkali ions can also be used in the ion pairs, e.g. lithium-copper and sodium-silver.

The material brought into contact with the glass surface to effect ion exchange may be any ionizable material containing exchangeable ions and may be in vapor, liquid, or solid form. The essential condition appears to be provision of intimate contact of exchangeable ions with the alkali containing glass surface. The process is termed thermochemical ion exchange, that is exchange of ions between two chemically combined materials in which the exchange rate is influenced by temperature.

The low temperature ion exchange treatment may be carried out by immersion of the preformed glass article in a molten salt bath, e.g. a soda glass in a potassium nitrate bath. Any alkali salt may be employed that provides the desired ion, does not decompose at treating temperature, and does not adversely affect the glass surface by chemical attack or otherwise. Mixed salts may be employed, although any substantial amount of the alkali ion being removed from the glass, or a smaller ion, should normally be avoided. It is recognized that molten alkali metal salt baths have been employed for thermal tempering. However, this is a physical treatment involving heat extraction, is of very short duration and is ineffective below the strain point of the glass.

The desired ion exchange may also be effected from a paste material applied over the glass surface prior to heat treatment. The paste may be produced by mixing an alkali metal salt with a small amount of known inert binder and/or filler materials, such as ochre, and a vehicle.

From the standpoint of ion exchange rate, it is preferable to employ lithia-zirconia-silica glasses wherein lithium ions in the glass are exchanged with sodium ions. However, technical and economic problems associated with melting and forming of such lithia glasses will frequently offset the factor of ion exchange time. Consequently, for many purposes it will be preferable to employ soda-zirconia-silica glasses and effect a sodium-potassium ion exchange. In general, there is little commercial interest in larger ion exchange pairs. Soda and lithia glasses may be employed in conjunction with silver or copper ion exchange materials where the special effects of such ions in glass are either desired or tolerable.

The embodiment of the invention involving lithia-zirconia-silica glasses is fully described in an application filed concurrently herewith in the name of H. M. Garfinkel, and details not recited here are incorporated by reference. The present description is more specifically directed to soda-zirconia-silica glasses adapted to sodium-potassium ion exchange. It will be understood, however that the general principles and procedures apply to all ion exchange pairs in this type of process.

$Na_2O$—$ZrO_2$—$SiO_2$ glasses suitable for present purposes of imparting increased abraded strength by ion exchange, as between sodium and potassium ions, will generally contain at least 10% $Na_2O$, at least 5% $ZrO_2$, 0–20% $Al_2O_3$, and a total content of $Al_2O_3$ plus $ZrO_2$ not over about 25%, the balance being essentially $SiO_2$. Optionally up to about 15% of other compatible glass-forming ingredients may be present in the glass composition. Glasses in which the $Na_2O$ content exceeds about 25% are generally too low in chemical durability to be of interest. Glasses having a total content of $ZrO_2$ plus $Al_2O_3$ over about 25%, and/or a content of $Na_2O$ under 10%, are usually too difficult to melt to be of economic interest. However, it will be appreciated that glasses outside these limits may still have reasonably good strengthening characteristics, in particular glasses having $Al_2O_3$ plus $ZrO_2$ contents in excess of 25%. The degree of strengthening attainable in a given glass within a given time normally diminishes as the content of $ZrO_2$ plus $Al_2O_3$ is decreased.

Figure 2:
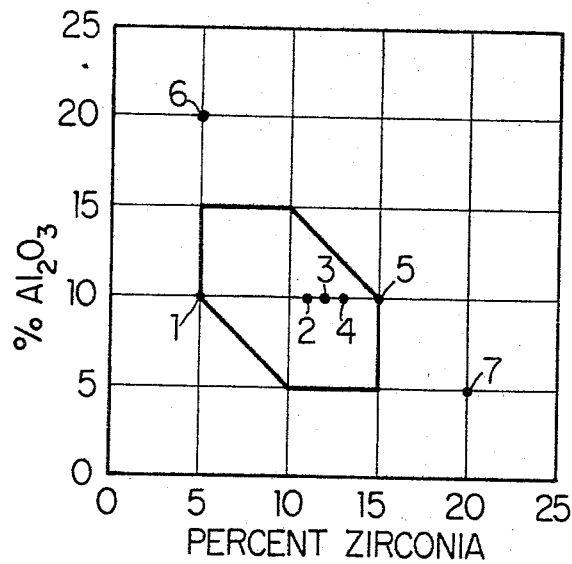

The invention will be better understood from reference to the accompanying drawing in which, FIGURE 1 is a graphical illustration of the effect on abraded strength resulting from glass composition changes, and FIGURE 2 is a binary composition diagram depicting a preferred embodiment of the invention.

In FIGURE 1, abraded strength (150 grit abrasion) is plotted as M.O.R. in p.s.i. along the vertical axis and percent by weight of $ZrO_2$ in a glass is plotted along the horizontal axis. The curves clearly indicate that abraded strength of the glass surface progressively increases at constant $Na_2O$ content as $ZrO_2$ is substituted for $SiO_2$ in simple $Na_2O$—$ZrO_2$—$SiO_2$ glasses having a $Na_2O$ content of 20%. It will be appreciated that while the actual strength values would vary, the same general trend would be found for similar comparisons at other soda contents.

The data, from which the curve in the drawing was plotted, were secured by melting a series of glasses composed of 20% $Na_2O$, 5–20% $ZrO_2$, and 75–60% $SiO_2$. In formulating this series of glasses, $ZrO_2$ was progressively increased at the expense of $SiO_2$. Each melt of glass was drawn into quarter inch glass cane and the cane cut into four inch lengths. For each glass, a set of 5 cane samples was immersed in a potassium nitrate bath maintained at the temperature of about 380° C., the immersion time being for a period of 16 hours. The cane samples were then removed, cooled and adherent salt washed from their surface. Samples were abraded with 150 grit silicon carbide paper and strength measurements made on each cane as previously described. The calculated M.O.R. values thus obtained for each set of cane were averaged to obtain the plotted values.

The liquidus temperature, in the $R_2O$—$ZrO_2$—$SiO_2$ glasses just described, increases rapidly with the $ZrO_2$ content, particularly near and above the 10% level where glasses become of greatest interest for strengthening purposes. While such glasses are otherwise quite desirable, this factor seriously limits their use because of the difficulty in forming ware from such a glass. As mentioned earlier, however, this factor may be greatly minimized, without unduly sacrificing other desirable features of the simple zirconia glasses, by employing an equivalent mixture of $ZrO_2$ and $Al_2O_3$, that is by substituting $Al_2O_3$ for $ZrO_2$ in a simple zirconia base glass.

The strengthening characteristics of a glass containing a mixture of $ZrO_2$ and $Al_2O_3$ do not vary substantially from those of a glass containing a corresponding content of $ZrO_2$ alone. Consequently, these oxides are generally interchangeable insofar as their effect on strengthening characteristics is concerned. However, liquidus temperature is still a factor, even in the mixed oxide glasses, and generally increases with the content of $ZrO_2$ plus $Al_2O_3$. Accordingly, the content of $ZrO_2$ should normally not exceed about 15% and the total content of $ZrO_2$ and $Al_2O_3$ should not exceed about 25% for reasonably good glass melting and forming characteristics.

In general, oxides other than $Na_2O$, $B_2O_3$ and $SiO_2$ tend to increase the liquidus temperature, and incremental changes in the flux oxides, $K_2O$ and $CaO$, may increase it quite sharply. Accordingly, while these oxides are highly desirable for other purposes, their individual contents should not exceed about 5%, and preferably no more than 2–3%.

The chemical durability of a glass surface, as measured by the resistance of that surface to attack by an acid solution, is another highly significant factor in the selection of a glass for many applications. A variety of different acid durability tests have been proposed, but for present purposes glasses are evaluated by a standard test of general applicability. In this test, a glass sample is immersed in a 10% hydrochloric acid solution at room temperature for 2 hours and the weight loss of the sample determined in milligrams per 100 square centimeters of glass surface (mg./100 sq. cms.). As a rule of thumb evaluation, glasses having a loss greater than 0.5 mg. are considered to have poor durability, those having a loss less than 0.05 mg. are considered good, and glasses having a loss intermediate these limits are considered to be acceptable in most applications.

Simple zirconia glasses, such as described earlier, have excellent acid durability characteristics. In contrast, simple alumina glasses have generally poor durability, particularly with alumina plus alkali metal oxide content in excess of about 35%. A particularly desirable feature of the mixed $ZrO_2$—$Al_2O_3$ glasses is that the good acid durability characteristics imparted by zirconia are largely retained providing the $ZrO_2$ plus $SiO_2$ content does not fall below about 65%.

Another factor or property of particular interest in the mixed $ZrO_2$—$Al_2O_3$ glasses is the relative steepness of their viscosity curves. This is particularly meaningful in connection with the present type of glass strengthening because it means that a given glass, having a favorable viscosity at a melting temperature of say 1500° C., will also have a relatively high strain point. This in turn means that the temperatures at which the glass is initially strengthened, and to which it may be subjected in subsequent service without significant stress release, are thus increased.

FIGURE 2 of the drawing is a binary composition diagram outlining a family of glass compositions that provide a particularly favorable combination of the various physical properties just discussed, that is vicosity curve, liquidus, strengthening capability and acid durability. In the figure, content of $ZrO_2$ is plotted along the horizontal axis, while content of $Al_2O_3$ is plotted along the vertical axis, both contents being in percent by weight. In addition to these two variable components, the glasses are composed of 16% $Na_2O$ and 3% $K_2O$ with $SiO_2$ making up the balance of the glass composition. As indicated in the graphical illustration, the individual contents of $ZrO_2$ and $Al_2O_3$ may vary within the ranges of 5–15% while their total content should be within the range of 15–25%.

While the alkali metal oxide contents are fixed in the graphical illustration, it will be understood that their contents may also vary somewhat while still retaining the generally desirable characteristics of this family of glasses. Thus, the $Na_2O$ content might be varied within the range of 12–16% and the $K_2O$ within a range of 1–5% while still retaining the general characteristics of the family. The ability to have $K_2O$ present is important because it permits use of an inexpensive raw material, e.g. nepheline syenite, as the source of alumina.

FIGURE 2 also designates, by use of encircled numbers, several specific compositions in the $$Na_2O\text{—}K_2O\text{—}ZrO_2\text{—}Al_2O_3\text{—}SiO_2$$

system. The following table sets forth various physical characteristics of these and other glasses to further illustrate the invention and particularly the foregoing general description of property characteristics. In the table, glasses are shown by their composition calculated in percent by weight and identified by their numbers in the drawing; liquidus and strain point are given in degrees centigrade;

TABLE I

| | 1 | 2 | 3 | 4 | 5 | 6 | 7 | 8 | 9 | 10 | 11 |
|---|---|---|---|---|---|---|---|---|---|---|---|
| $SiO_2$ | 66 | 60 | 59 | 58 | 56 | 56 | 56 | 52 | 52 | 52 | 56 |
| $Al_2O_3$ | 10 | 10 | 10 | 10 | 10 | 20 | 5 | 25 | | 10 | 10 |
| $ZrO_2$ | 5 | 11 | 12 | 13 | 15 | 5 | 20 | | 25 | 15 | 11 |
| $Na_2O$ | 16 | 16 | 16 | 16 | 16 | 16 | 16 | 16 | 16 | 16 | 16 |
| $K_2O$ | 3 | 3 | 3 | 3 | 3 | 3 | 3 | 7 | 7 | 7 | 7 |
| M.O.R. | 29 | 47 | 58 | 60 | 53 | | 48 | 67 | 68 | 70 | 48 |
| Durability | G | G | G | G | G | P | G | P | G | G | A |
| Liquidus | | 849 | 1,107 | 1,171 | 1,191 | 990 | 1,268 | 1,158 | 1,384 | 1,295 | 1,179 |
| Strain point | | 573 | 588 | 577 | | | | 546 | | 594 | 568 |
| $T_{2000}$—$T_{s.p.}$ | | 742 | 752 | 748 | | | | 829 | | 661 | 692 | acid durability as shown as G (Good), A (Acceptable), or P (Poor) on the basis described earlier; strengthening is shown as average M.O.R. in thousands of lbs./sq. inch, as measured on tumble abraded cane samples ion exchanged in a fused $KNO_3$ bath for 4 hours at 500° C.; $T_{2000}-T_{s.p.}$ shows the difference in degrees centigrade between the temperature at which the glass has a viscosity of 2000 poises (a temperature in the melding range) and the strain point temperature.

As developed earlier, the "ideal" glass for general utility would have good durability, low liquidus and/or high viscosity at the liquidus, high strain point, a low temperature spread between melting temperature and strain point as evidenced by a low value for $T_{2000}-T_{s.p.}$, and good strengthening potential. Necessarily, a compromise must be made, but it is apparent that glasses within the outlined area of FIGURE 2 are generally good in all respects described. Optimum glasses will include glasses 2–4 and will consist essentially of 55–65% $SiO_2$, 10–12% $Al_2O_3$, 10–13% $ZrO_2$, 12–16% $Na_2O$, and 1–3% $K_2O$.

Oxides other than those already prescribed appear to have little beneficial effect on the strengthening of a glass. In small amounts, however, they may be desirable for such secondary purposes as improving melting characteristics of a glass and modifying glass properties, e.g. expansion coefficient and refractive index. These optional additives include divalent oxides, $K_2O$, $B_2O_3$, $P_2O_5$, $TiO_2$ and F. In general such additives may be introduced into glasses of high strengthening potential in amounts up to about 10% individually and about 15% collectively. Such maximum amounts may reduce maximum M.O.R. after ion exchange by as much as a half. Also, use of excess may have side effects as shown for $K_2O$. Normally, $LiO_2$ should not exceed 1%. The usual additives, such as colorants and fining agents, may be included in accordance with glassmaking practice.

By way of illustrating the increase in 150 grit abraded strength in accordance with the invention, reference is made to glass canes similar in all respects to those from which the data for the drawing were obtained, except that the canes are annealed and abraded without ion exchange or other processing. The M.O.R. on such abraded, untreated canes is normally from 8,000 to 12,000 p.s.i.

By way of illustrating the comparable strengthening effects obtainable by treatment of the usual commercial lime glasses, corresponding strength measurements were made on cane drawn from a high chemical durability, general purpose lime glass commercially available in cane form and having the following composition: 69.9% $SiO_2$, 2.0% $Al_2O_3$, 12.1% $Na_2O$, 6.0% $K_2O$, 4.1% CaO, 2.9% MgO, and 3.0% $B_2O_3$. Canes were treated in a $KNO_3$ salt bath for 16 hours at 350° C. The average M.O.R. on unbraided cane was 56,000 p.s.i.; on 150 grit abraded cane, 18,000 p.s.i.; and on tumble abraded 14,000 p.s.i. By comparison, the corresponding average M.O.R.'s on untreated canes were respectively 21,000, 9,000 and 8,000.

In general, the effect of zirconia in lithium silicate glasses parallels that heretofore described for soda glasses. This may be seen from the following table showing a series of $Li_2O$—$ZrO_2$—$SiO_2$ glass compositions in weight percent and corresponding average M.O.R. values calculated from breaking load measurements made on cane strengthened by treatment in a sodium nitrate bath at 400° C. for four hours and tumble abraded.

While substantial degree of strengthening can be obtained with lithia contents as low as 1 to 2%, it is generally preferable that the glass contain from about 5% by weight to about 20%. Relatively large amounts of lithia render the glass very soft and difficult to work while apparently providing somewhat less than optimum strengthening characteristics as well. The content of zirconia should be as high as feasible and at least 10% by weight.

Optionally, other glass-forming oxides, e.g. $K_2O$, $Na_2O$, divalent oxides including PbO, $TiO_2$, $B_2O_3$, and $P_2O_5$, as well as fluorine, may be present in amounts up to 15 mol percent depending on the particular oxide, with the collective content not exceeding about 20 mol percent. In general, these oxides are not beneficial to strengthening and may, particularly in large amounts, seriously diminish potential strength in a glass. The optional oxides may be desirable as an aid in melting, particularly where the lithia content is low, as an aid in reducing devitrification tendencies, and as an aid in improving durablity and modifying such properties as refractive index.

I claim:
1. In a method for strengthening an alkali metal silicate glass article in which the alkali metal ions in a surface of the glass article are replaced by larger monovalent metal ions selected from the group consisting of the alkali metals, copper, and silver by bringing the surface of the glass article into contact with a source of said larger monovalent metal ions while retaining the glass at a temperature above about 200° C. but below the strain point of the glass until the surface of the glass article to a depth of at least 5 microns is placed in compression, the improvement which comprises forming the article to be strengthened from an alkali metal zirconosilicate glass consisting essentially, by weight on the oxide basis, of about 5–25% $R_2O$, wherein $R_2O$ consists of 0–20% $Li_2O$ and 0–25% $Na_2O$, 5–25% $ZrO_2$, and $SiO_2$, the sum of $ZrO_2$ and $SiO_2$ constituting at least 65% by weight of the glass composition.

2. A method according to claim 1 wherein said article to be strengthened consists essentially, by weight on the oxide basis, of about 10–25% $Na_2O$, 5–25%

$$ZrO_2+0-20\%$$

$Al_2O_3$, the sum of $ZrO_2+Al_2O_3$ totalling about 5–25%, and $SiO_2$, the total of $Na_2O$, $ZrO_2$, $Al_2O_3$, and $SiO_2$ constituting at least 85% by weight of the glass composition.

3. A method according to claim 2 wherein the larger monovalent ions are potassium ions.

4. A method according to claim 1 wherein said article to be strengthened consists essentially, by weight on the oxide basis, of about 5–20% $Li_2O$, 10–25% $ZrO_2$, and $SiO_2$, the total of $Li_2O$, $ZrO_2$, and $SiO_2$ constituting at least 80 mole percent of the glass composition.

5. A method according to claim 4 wherein the larger monovalent ions are sodium ions.

6. A strengthened alkali metal zirconosilicate glass article containing ions of an alkali metal and of a monovalent metal of larger size selected from the group consisting of the alkali metals, copper, and silver, and having a surface compressive stress layer of a depth of at least 5 microns and an interior portion, the concentration of the monovalent metal ions of larger size being greater in the surface layer than in the interior portion of the article and the concentration of the smaller alkali metal ions being greater in the interior portion of the article than in the

TABLE II

| Wt. percent | 1 | 2 | 3 | 4 | 5 | 6 | 7 | 8 | 9 | 10 |
|---|---|---|---|---|---|---|---|---|---|---|
| $SiO_2$ | 75.0 | 74.0 | 70.8 | 76.5 | 68.2 | 63.5 | 70.0 | 64.2 | 74.0 | 76.5 |
| $ZrO_2$ | 19.7 | 20.0 | 20.0 | 15.0 | 15.7 | 20.3 | 20.5 | 25.7 | 18.0 | 13.0 |
| $Li_2O$ | 4.8 | 5.5 | 8.7 | 8.0 | 5.1 | 5.1 | 6.4 | 4.6 | 5.5 | 8.0 |
| $Na_2O$ | | | | | 10.5 | 10.6 | 2.6 | | | |
| CaO | | | | | | | | 5.0 | 2.0 | 2.0 |
| $As_2O_3$ | 0.5 | 0.5 | 0.5 | 0.5 | 0.5 | 0.5 | 0.5 | 0.5 | 0.5 | 0.5 |
| M.O.R.×10⁻³ p.s.i. | 29 | 39 | 64 | 53 | 30 | 24 | 50 | 28 | 25 | 28 | surface layer thereof, the interior portion of said glass article having a composition consisting essentially, by weight on the oxide basis, of about 5–25% $R_2O$, wherein $R_2O$ consists of 0–20% $Li_2O$ and 0–25% $Na_2O$, 5–25% $ZrO_2$, and $SiO_2$, the sum of $ZrO_2$ and $SiO_2$ constituting at least 65% by weight of the glass composition.

7. An article according to claim 6 wherein said interior portion consists essentially, by weight on the oxide basis, of about 10–25% $Na_2O$, 5–25% $ZrO_2+$0–20% $Al_2O_3$, the sum of $ZrO_2+Al_2O_3$ totalling about 5–25%, and $SiO_2$, the total of $Na_2O$, $ZrO_2$, $Al_2O_3$, and $SiO_2$ constituting at least 85% by weight of the glass composition.

8. An article according to claim 7 wherein said interior portion consists essentially, by weight on the oxide basis, of about 12–16% $Na_2O$, 1–3% $K_2O$, 10–12% $Al_2O_3$, 10–13% $ZrO_2$, and 55–65% $SiO_2$.

9. An article according to claim 7 wherein the monovalent metal ions of larger size are potassium ions.

10. An article according to claim 6 wherein said interior portion consists essentially, by weight on the oxide basis, of about 5–20% $Li_2O$, 10–25% $ZrO_2$, and $SiO_2$, the total of $Li_2O$, $ZrO_2$, and $SiO_2$ constituting at least 80 mole percent of the glass composition.

11. An article according to claim 10 wherein the monovalent metal ions of larger size are sodium ions.

References Cited

UNITED STATES PATENTS 2,779,136   1/1957   Hood et al. _____ 65—30

FOREIGN PATENTS

62/2,352   1962   Republic of South Africa.

OTHER REFERENCES

Kistler, S. S., Stresses in Glass Produced by Nonuniform Exchange of Monovalent Ions, J. Am. Ceram. Soc., vol. 45, No. 2, pp. 59–68, February, 1962.

S. LEON BASHORE, Primary Examiner

J. H. HARMAN, Assistant Examiner

U.S. Cl. X.R.

65—30; 106—52